(12) United States Patent
Koneru et al.

(10) Patent No.: US 11,880,942 B2
(45) Date of Patent: Jan. 23, 2024

(54) SYSTEMS AND METHODS FOR USING A LOCATION-BASED FIELD OF VIEW ASSOCIATED WITH A VIRTUAL LOCATION MARKER

(71) Applicant: Verizon Patent and Licensing Inc., Basking Ridge, NJ (US)

(72) Inventors: Rahul Koneru, Ashburn, VA (US); Pradeep Menon, Potomac, MD (US); Brian M Vanderwiel, San Marcos, CA (US); Ricky Kwan, Maplewood, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/544,255

(22) Filed: Dec. 7, 2021

(65) Prior Publication Data

US 2023/0177773 A1     Jun. 8, 2023

(51) Int. Cl.
*G06T 19/00*      (2011.01)
*H04W 4/021*    (2018.01)
*H04W 4/80*      (2018.01)

(52) U.S. Cl.
CPC ........... *G06T 19/003* (2013.01); *H04W 4/022* (2013.01); *H04W 4/80* (2018.02)

(58) Field of Classification Search
CPC ...... G06T 19/003; H04W 4/022; H04W 4/80; H04W 4/029; H04W 4/021
See application file for complete search history.

(56) References Cited

U.S. PATENT DOCUMENTS

| | | | |
|---|---|---|---|
| 10,699,488 B1* | 6/2020 | Terrano | G06N 20/00 |
| 2008/0016472 A1* | 1/2008 | Rohlf | G06F 16/9537 |
| | | | 715/848 |
| 2011/0310227 A1* | 12/2011 | Konertz | G06T 19/006 |
| | | | 348/46 |
| 2016/0140553 A1* | 5/2016 | Faith | G06Q 30/06 |
| | | | 705/44 |
| 2019/0236843 A1* | 8/2019 | Baumbach | H04W 4/06 |
| 2020/0349774 A1* | 11/2020 | Martin | G06T 19/006 |

* cited by examiner

*Primary Examiner* — Chong Wu (57) ABSTRACT

An exemplary method includes a proximity detection system that accesses information associated with a virtual location marker positioned in relation to a geographic area. The information defines a location-based field of view ("LFOV") that extends directionally from the virtual location marker. The proximity detection system further tracks a location of a mobile computing device at the geographic area and determines, based on the information associated with the virtual location marker and the location of the mobile computing device, that the mobile computing device has entered the LFOV that extends directionally from the virtual location marker.

17 Claims, 10 Drawing Sheets

SYSTEMS AND METHODS FOR USING A LOCATION-BASED FIELD OF VIEW ASSOCIATED WITH A VIRTUAL LOCATION MARKER

BACKGROUND INFORMATION

Advances in sensor and computer processing technologies have resulted in various ways to facilitate touchless interaction with respect to devices/products. For example, near field communication ("NFC") technology, radio-frequency identification ("RFID") technology, and computer vision technologies have been implemented in various cases to facilitate touchless shopping in retail solutions. However, NFC tags have an operational distance of just a few centimeters, which is not optimal for many use cases. In addition, RFID technology, using either active RFID tags or passive RFID tags, has drawbacks that make it unsuitable in various implementations. For example, passive RFID tags require expensive infrastructure and suffer from location data limitations. Active RFID tags may use relatively more cost-efficient RFID reader infrastructure (e.g., Bluetooth or Ultra-wideband technologies) but are individually costly. Even though the cost of individual active RFID tags continues to decrease, they still remain cost prohibitive to implement in many use cases. Moreover, computer vision methodologies used in existing product offerings and solutions typically require significant investment in imaging devices, other hardware, hardware installation, software applications, and/or initial set up, which also renders them cost prohibitive to implement in many use cases.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Systems and methods for using a location-based field of view associated with a virtual location marker are described herein. In certain examples, for instance, an exemplary method may include accessing, by a proximity detection system, information associated with a virtual location marker positioned in relation to a geographic area. The information may define a location-based field of view ("LFOV") that extends directionally from the virtual location marker. The method may further include the proximity detection system tracking a location of a mobile computing device at the geographic area and determining, based on the information associated with the virtual location marker and the location of the mobile computing device, that the mobile computing device has entered the LFOV that extends directionally from the virtual location marker.

Various advantages and benefits are associated with the systems and methods for using an LFOV associated with a virtual location marker described herein. For example, systems and methods such as those described herein may provide solutions that cost relatively less and have a relatively higher accuracy than conventional RFID solutions. In addition, the systems and methods described herein do not require computer vision and/or sensor fusion technologies, which are relatively more complex and cost prohibitive. Moreover, systems and methods such as those described herein result in an enhanced user experience as compared to other solutions such as those that implement NFC technologies. These and other benefits that may be provided by systems and methods described herein will be evident from the disclosure that follows.

Figure 1:
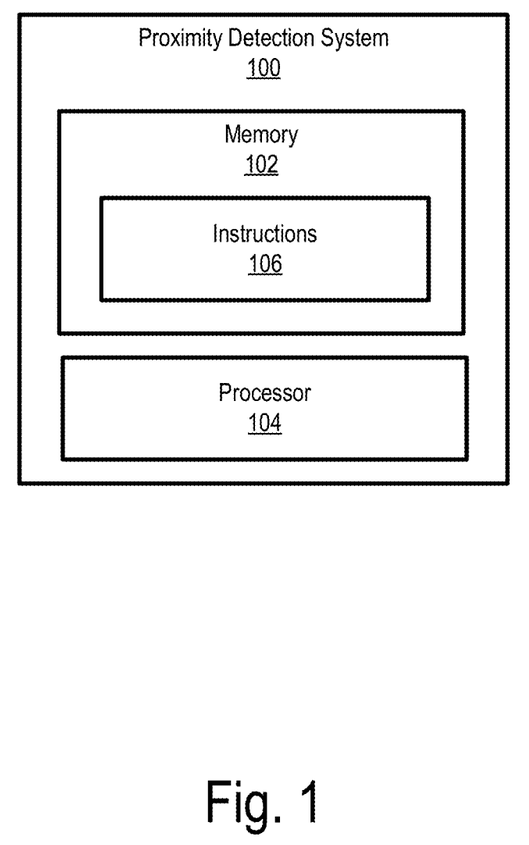
FIG. 1 illustrates an exemplary proximity detection system according to principles described herein.

FIG. 1 illustrates an exemplary proximity detection system 100 ("system 100"). As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data associated with virtual location markers, data associated with geographic areas (e.g., three-dimensional ("3D") maps of geographic areas), data defining LFOVs associated with virtual location markers, notification information, user information, graphical user interface content, and/or any other suitable data.

Processor 104 may be configured to perform (e.g., execute instructions 106 stored in memory 102 to perform) various processing operations associated with using an LFOV associated with a virtual location marker. For example, processor 104 may perform one or more operations described herein to determine whether a mobile computing device moves within an LFOV associated with a virtual location marker and perform a predefined operation based on the determination. These and other operations that may be performed by processor 104 are described herein.

As used herein, a "virtual location marker" refers to any suitable virtual point in space that may be defined in relation to a geographic area and that may be associated with an LFOV. A virtual location marker may be defined by x, y, and z coordinates that are mapped to a specific location within the geographic area. In certain examples, a plurality of virtual location markers may be defined in relation to a geographic area. For example, a geographic area may include a first virtual location marker, a second virtual location marker, and a third virtual location marker. The first, second, and third virtual location markers may each be associated with a different LFOV. Any suitable number of virtual location markers may be defined in relation to a geographic area as may serve a particular implementation. In certain examples, a virtual location marker may be associated with a point of interest at a geographic area. For an example, a virtual location marker may be associated with an object of interest, a point of entry, a point of exit, an item purchasable by a user, etc. Specific examples of virtual location markers will be described further herein.

As used herein, an "LFOV" refers to a virtual shape with defined boundaries that may be used to determine whether a mobile computing device comes within a certain proximity of a virtual location marker. An LFOV may have any size, orientation with respect to a virtual location marker, and/or shape as may serve a particular implementation. In certain examples, an LFOV may be a virtual 3D shape. For example, an LFOV may be in the shape of a 3D pyramid, a triangular prism, a cone, a hexagonal prism, a cylinder, or any other suitable 3D shape. An LFOV may extend directionally from a virtual location marker such that the LFOV occupies only a fraction of the area surrounding the virtual location marker in the geographic area. In certain examples, an LFOV may extend a predefined distance and/or in a predefined fixed direction from a virtual location marker. Exemplary LFOVs are described herein.

System 100 (e.g., processor 104) may be configured to provide any suitable service and/or feature that may be associated with LFOVs as may serve a particular implementation. For example, system 100 may be configured to facilitate determining whether at least part of a mobile computing device moves within an LFOV associated with a virtual location marker. To that end, system 100 may access information associated with the virtual location marker positioned in relation to a geographic area. Such information associated with a virtual location marker may include any suitable information that may be used to define a virtual location marker and an LFOV associated with the virtual location marker. For example, the information may specify x, y, and z coordinates of the virtual location marker that are mapped to a real-world location at the geographic area. In certain examples, the information associated with the virtual location marker may specify a fixed location of the virtual location marker in relation to the geographic area. In addition, the information may define a direction that an LFOV extends from the virtual location marker, a size of an LFOV, a shape of an LFOV, and/or any other suitable information associated with an LFOV.

System 100 may access the information associated with a virtual location marker in any suitable manner. For example, system 100 may access the information associated with a virtual location marker from a location database that may be provided at any suitable storage location. Such a location database may be used to maintain any suitable information associated with a geographic area and one or more virtual location markers that may be positioned in relation to the geographic area. In certain examples, system 100 may be configured to generate and maintain a location database where the information associated with one or more virtual location markers is stored.

In certain examples, system 100 may be configured to generate or otherwise access a 3D map of a geographic area. The 3D map may be generated in any suitable manner. For example, a 3D coordinate system (x, y, z) may be used to establish the boundaries of the 3D map. Each vertex of the 3D map may be stored as part of the location database accessed by system 100. For example, if the 3D map is in the shape of a cube or a cuboid, the x, y, and z coordinates of each of the eight corners of the cube or cuboid may be stored as part of the location database. Virtual location markers and LFOVs may be defined according to a 3D coordinate system and may have defined coordinates and dimensions in the 3D map that are mapped to real-world coordinates within the geographic area.

Figure 2:
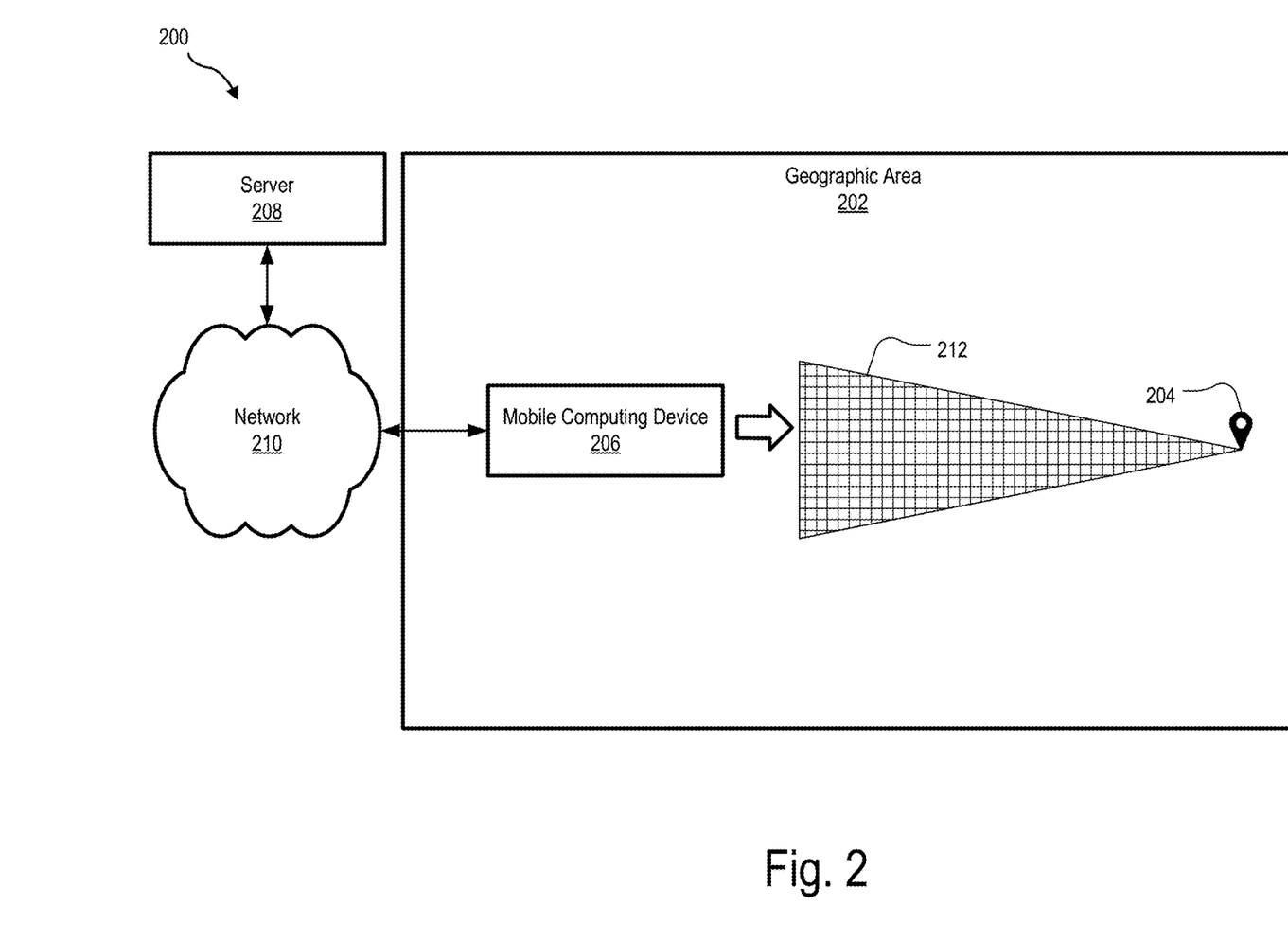
FIGS. 2-4 illustrate exemplary implementations of the proximity detection system of FIG. 1 according to principles described herein.

System 100 may be implemented in any suitable manner as may serve a particular implementation. FIG. 2 shows an exemplary implementation 200 in which system 100 may be provided in certain examples. As shown in FIG. 2, implementation 200 includes a geographic area 202 in which a virtual location marker 204 and a mobile computing device 206 are provided. Geographic area 202 may correspond to any suitable area where it may be desirable to track a position of mobile computing device 206 in relation to virtual location marker 204. For example, geographic area may correspond to a real-world location such as a warehouse, a retail store, a factory, an outdoor area, a point of entry (e.g., a border crossing), a point of exit (e.g., an exit from a venue), or any other suitable area.

Mobile computing device 206 may correspond to any suitable computing device that may be transported or otherwise moved within geographic area 202. For example, mobile computing device 206 may correspond to a smart phone, a tablet computer, a laptop computer, a smart watch, smart glasses, a robotic device, or any other suitable mobile computing device. As shown in FIG. 2, mobile computing device 206 is communicatively connected to a server 208 by way of a network 210. Server 208 may include any suitable computing device or system that may facilitate performing any of the operations described herein. In certain examples, server 208 may correspond to a cloud server. In certain examples, server 208 may maintain a location database that stores any suitable information, such as described herein, that may be associated with LFOVs. In certain alternative examples, all or a portion of such a location database may be stored internally by mobile computing device 206.

System 100 may be implemented by server 208 or mobile computing device 206. Alternatively, system 100 may be distributed across server 208, mobile computing device 206, and/or any other suitable computer system.

Network 210 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between server 208 and mobile computing device 206. Communications between mobile computing device 206, server 208, and any other system may be transported using any one of the above-listed networks, or any combination or sub-combination of the above-listed networks.

Virtual location marker 204 is depicted with a location tag icon in FIG. 2 for illustrative purposes. It is understood that, in certain implementations, virtual location marker 204 may be just defined by x, y, and z coordinates that are mapped to geographic area 202. That is, virtual location marker 204 may not be represented by or otherwise include a physical marker located at geographic area 202. In certain alternative implementations, a physical tag, a sticker, a wireless device (e.g., internet of things ("IoT") device), or other item may be positioned at geographic area 202 and may indicate a real-world location of virtual location marker 204.

As shown in FIG. 2, an LFOV 212 extends directionally from virtual location marker 204. In the example shown in FIG. 2, LFOV 212 only represents a subset of the area around virtual location marker 204. As such, only a fraction of the space around virtual location marker 204 may be used to determine whether mobile computing device 206 is within a predefined proximity of virtual location marker 204. LFOV 212 is depicted as having a triangular shape in FIG. 2 for illustrative purposes. It is understood that LFOV 212 may have any other suitable shape such as described herein.

In certain implementations, an LFOV may be selectably adjustable through user input. In such examples, system 100 may provide any suitable user interface to facilitate a user changing a size, shape, and/or orientation of an LFOV to better suit a particular implementation. To illustrate an example, virtual location marker 204 may be positioned in relation to an item that is purchasable by users of mobile computing devices. LFOV 212 may facilitate an operation associated with the item (e.g., identifying a location of a pallet of the item and directing a robotic device to travel to the location, adding the item to a virtual shopping cart, or the like) when mobile computing device 206 enters LFOV 212. LFOV 212 may initially have a first size such that LFOV 212 extends out into an aisle in front of the item. With the first size of LFOV 212, mobile computing devices of users that approach the item (e.g., that may be interested in the item) as well as mobile computing devices of users that pass by but do not approach the item (e.g., that may not be interested in the item) may move through LFOV 212. As such, the first size of LFOV 212 may be too large and may trigger unwanted interactions with mobile computing devices of users that may not be interested in the item. In such examples, system 100 may prompt a user to selectively reduce the size of LFOV 212 from the first size to a second size that is relatively smaller than the first size. In so doing, it may be possible to reduce false positives that may otherwise occur. After system 100 adjusts the size, shape, and/or orientation of an LFOV based on user input, the LFOV may be fixed in position until an additional user input is provided to change the size, shape, and/or orientation of the LFOV.

In certain additional or alternative implementations, system 100 may be configured to automatically adjust a size, shape, and/or configuration of an LFOV. For example, system 100 may automatically adjust a size, shape, and/or configuration of an LFOV based on patterns detected with respect to LFOVs and mobile computing devices as the mobile computing devices move within a geographic area. As used herein, the expression "automatically" means that an operation (e.g., a change in size of an LFOV) or series of operations are performed without requiring further input from a user. For example, system 100 may automatically adjust a directional orientation of LFOV 212 if system 100 determines that users of mobile computing devices typically approach virtual location marker 204 from a direction that is different than that depicted in FIG. 2.

Figure 3:
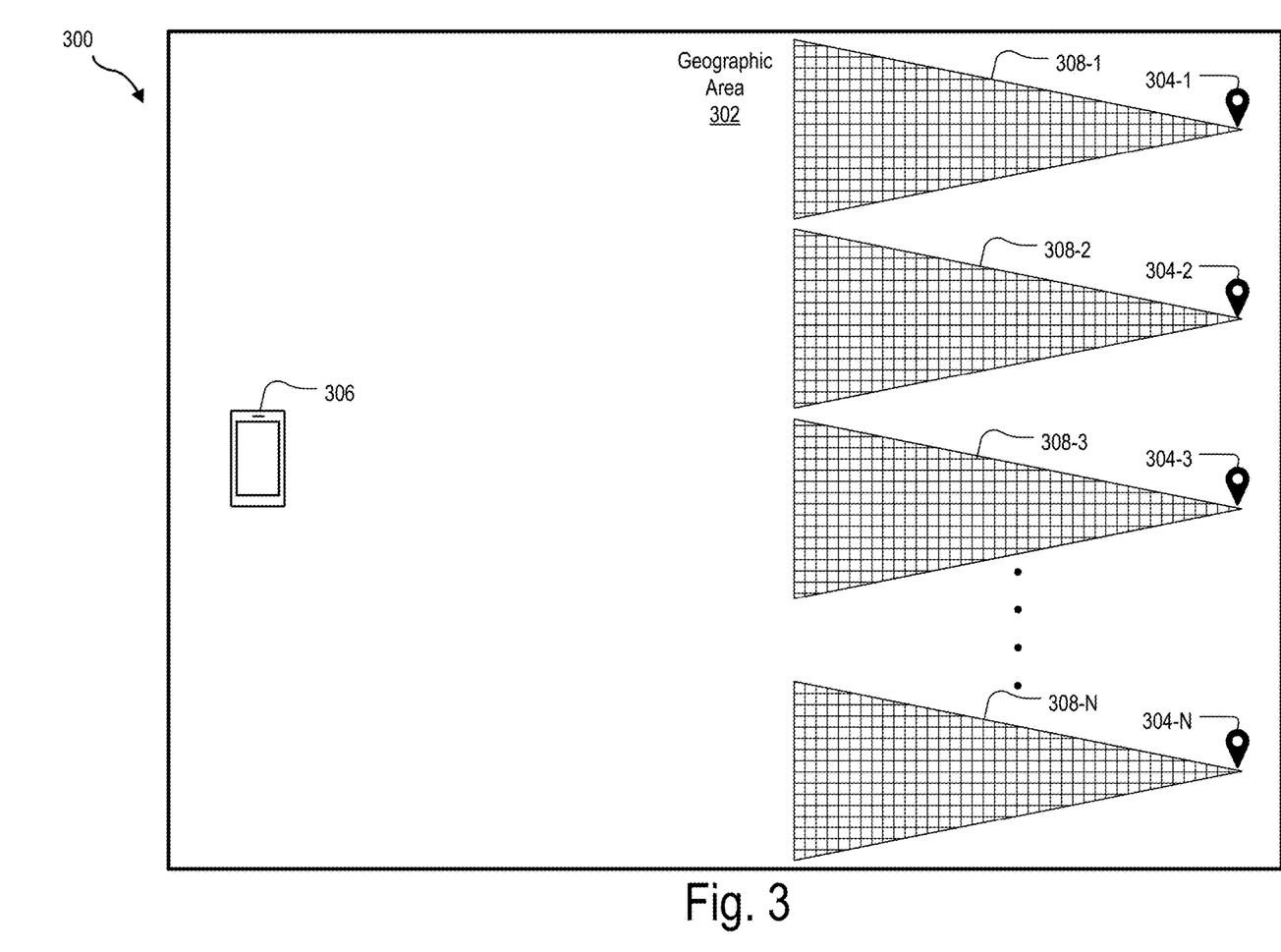

In certain examples, a plurality of virtual location markers may be positioned in relation to a geographic area. To illustrate, FIG. 3 shows an exemplary implementation 300 that depicts a geographic area 302 in which a plurality of virtual location markers 304 (e.g., virtual location markers 304-1 through 304-N) are defined. A mobile computing device in the form of a smartphone 306 is also located within geographic area 302. As shown in FIG. 3, each virtual location marker 304 is associated with a respective one of a plurality of LFOVs 308 (e.g., LFOV 308-1 through LFOV 308-N). In particular, LFOV 308-1 extends directionally from virtual location marker 304-1, LFOV 308-2 extends directionally from virtual location marker 304-2, LFOV 308-3 extends directionally from virtual location marker 304-3, and so forth. Although each of LFOVs 308 are shown as having the same size, shape, and orientation in FIG. 3, it is understood that one or more of LFOVs 308 may have different shapes, sizes, and/or orientations with respect to their corresponding virtual location marker 304 in certain implementations.

Figure 4:
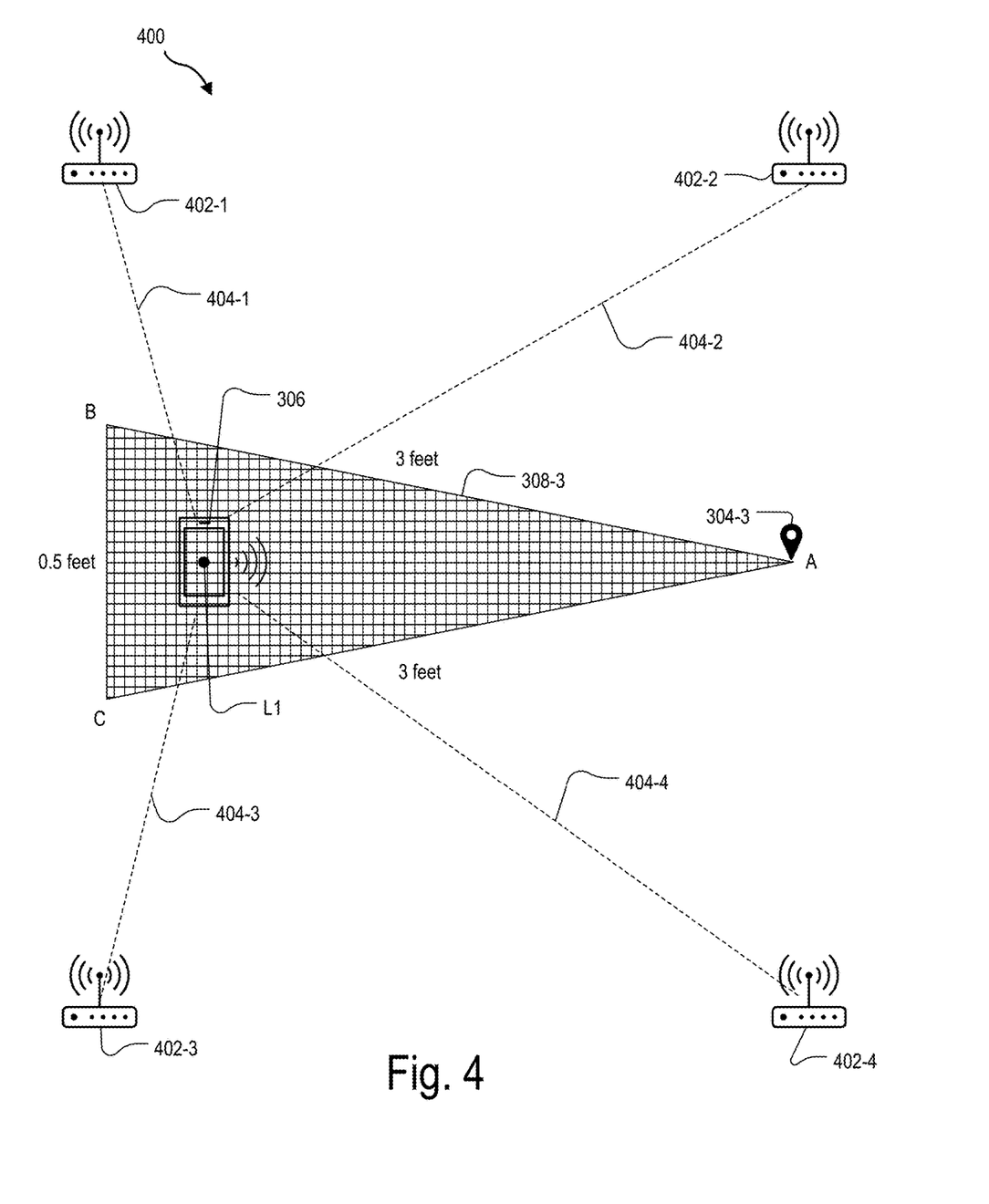

Smartphone 306 may be movable or may be configured to move anywhere within geographic area 302. Accordingly, system 100 may track a location of smartphone 306 as smartphone 306 moves within geographic area 302. This may be accomplished in any suitable manner. For example, system 100 may track the location of smartphone 306 based on signals (e.g., Bluetooth signals) received by smartphone 306 from one or more of a plurality of beacon devices located at geographic area 302. Such beacons may be used to determine a hyper precise location of smartphone 306 at any given time within geographic area 302. To illustrate, FIG. 4 shows an exemplary implementation 400 in which beacons 402 (e.g., beacons 402-1 through 402-4) may be used to track the location of smartphone 306. Beacons 402 may correspond to any suitable beacon as may serve a particular implementation. For example, beacons 402 may correspond to 5G beacons that are each configured to emit a signal used to determine a location of a mobile computing device such as smartphone 306. Such 5G beacons may be used by system 100, in any suitable manner, as part of a 5G hyper precise location ("HPL") service powered by a Real Time Kinematics ("RTK") network.

In certain examples, system 100 may store, as part of a location database, the distances between each of virtual location markers 304 and beacons 402. Such information may then be compared against the detected distances from smartphone 306 to beacons 402 to calibrate beacons 402. In so doing, it may be possible to reduce the margin of error that may occur as a result of the signals emitted from beacons 402 being affected by certain material surfaces (e.g., metal or concrete surfaces) within a geographic area.

System 100 may determine a distance 404-1 from beacon 402-1 to smartphone 306 based on a strength of the signal emitted from beacon 402-1 and received by smartphone 306. Similarly, system 100 may determine a distance 404-2 from beacon 402-2 to smartphone 306 based on a strength of the signal emitted from beacon 402-2 and received by smartphone 306, a distance 404-3 from beacon 402-3 to smartphone 306 based on a strength of the signal emitted from beacon 402-3 and received by smartphone 306, and a distance 404-4 from beacon 402-4 to smartphone 306 based on a strength of the signal emitted from beacon 402-4 and received by smartphone 306. System 100 may then determine a location L1 of smartphone 306 based on distances 404-1 through 404-4.

In certain examples, system 100 may additionally or alternatively determine the distance between beacons 402 and smartphone 306 based on timing signals. For example, the time it takes for a signal to travel one-way or roundtrip between beacon 402-1 and smartphone 306 may be used to determine distance 404-1. Similarly, system 100 may determine a distance 404-2 from beacon 402-2 to smartphone 306 based on the time it takes for a signal to travel one-way or roundtrip between beacon 402-2 and smartphone 306, a distance 404-3 from beacon 402-3 to smartphone 306 based on the time it takes for a signal to travel one-way or roundtrip between beacon 402-3 and smartphone 306, and a distance 404-4 from beacon 402-4 to smartphone 306 based on the time it takes for a signal to travel one-way or roundtrip between beacon 402-4 and smartphone 306. System 100 may then determine a location L1 of smartphone 306 based on distances 404-1 through 404-4.

In the example shown in FIG. 4, side AB of LFOV 308-3 is shown as being 3 feet long, side AC of LFOV 308-3 is shown as being 3 feet long, and side BC of LFOV is shown as being 0.5 feet long. With LFOVs such as LFOV 308-3 having dimensions such as those shown in FIG. 4, it is possible to detect the presence of smartphone 306 with respect to virtual location marker 304-3 without requiring smartphone 306 to be extremely close to virtual location marker 304-3. In so doing, it is possible to increase a user experience associated with using virtual location markers as compared to NFC solutions in which the operational distance to interact with an NFC tag is under, for example, two inches. The dimensions of LFOV 308-3 shown in FIG. 4 are provided for illustrative purposes only. It is understood that LFOVs such as LFOV 308-3 may have any suitable size and/or shape as may serve a particular implementation.

Beacons such as beacons 402 may be positioned in any suitable manner with respect to a geographic area. For example, beacons 402 may be positioned at corners of a space defined by a geographic area. Although FIG. 4 only shows four of beacons 402, it is understood that fewer or more beacons may be used in other implementations.

Based on the information associated with the virtual location marker and the location of a mobile computing device, system 100 may determine whether the mobile computing device has entered an LFOV. This may be accomplished in any suitable manner. For example, system 100 may use the same side rule in certain examples to determine whether a determined location of a mobile computing device is within an LFOV. To illustrate with reference to FIG. 4, a determined location L1 of smartphone 306 may be considered to be within LFOV 308-3 if location L1 is on the same side of side AB as corner C, on the same side of side BC as corner A, and on the same side as side CA as corner B. Each side may be tested using the same side rule to determine whether determined location L1 of smartphone 306 is inside LFOV 308-3. For example, if side [B-A] cross [L1-A] is in the same direction as [B-A] cross [C-A] then determined location L1 of smartphone 306 may be considered as being within LFOV 308-3.

System 100 may use additional or alternative techniques to determine whether a determined location of a mobile computing device is within an LFOV. For example, a barycentric coordinates methodology may be used to test whether the location of a mobile computing device is within an LFOV in certain examples. The barycentric coordinates methodology relies on the law of proportion by putting weights on each vertex and leveraging the ratios of angles and sides to test if a point lies inside an LFOV. Another approach may include using rasterization to perform grid computations and generate LFOV eligible coordinates. In yet another approach, mesh grid functions and/or polygon fill functions may be used from any of several libraries such as MATLAB, Fortran90, or the Python library to compute an LFOV grid and store information associated with the LFOV grid in a location database.

In certain examples, system 100 may continually track the location of a mobile computing device and continually perform one or more operations such as those described above to determine in real time whether the mobile computing device is within an LFOV. In certain alternative implementations, system 100 may periodically track the location of a mobile computing device and periodically perform one or more of the operations such as those described above.

Figure 5:
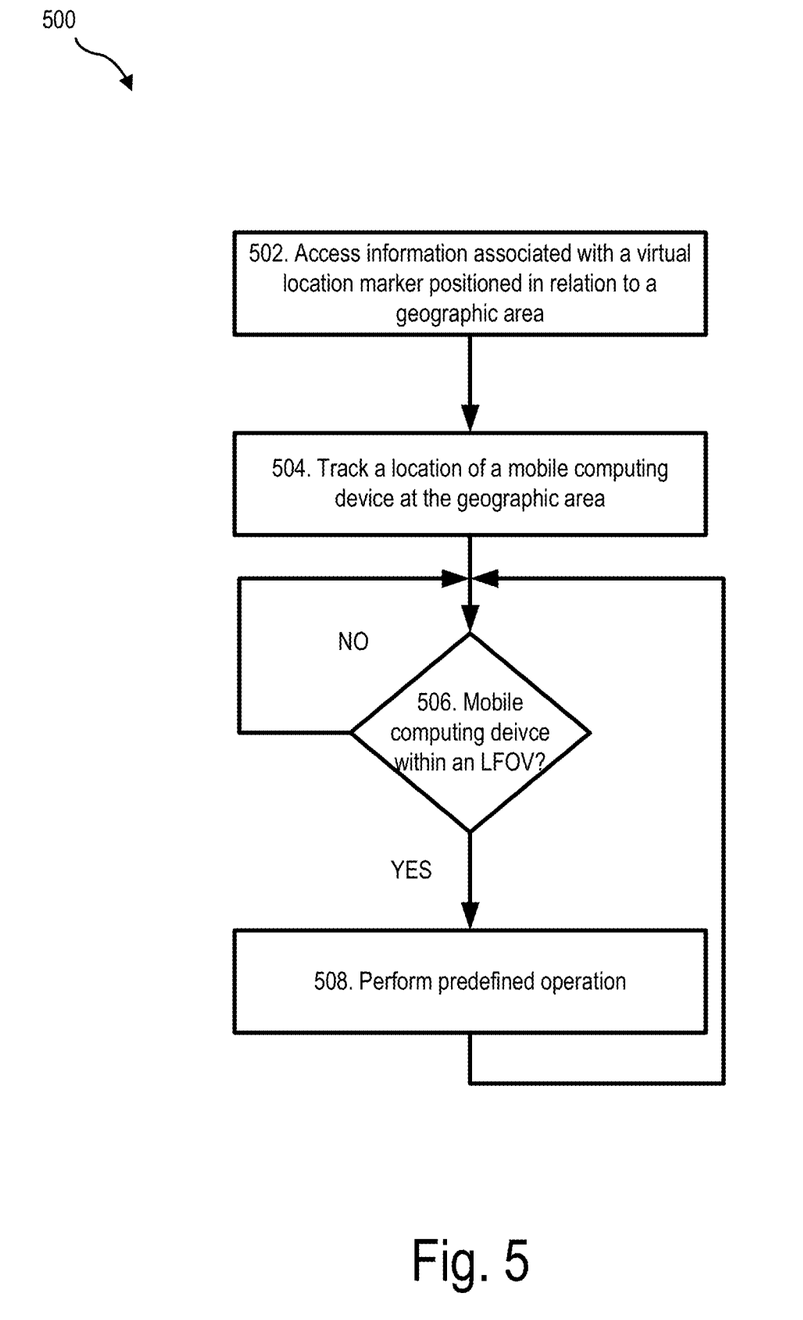
FIG. 5 illustrates and exemplary flow chart depicting various operations that may be performed according to principles described herein.

FIG. 5 depicts a flowchart 500 showing exemplary operations that may be performed by system 100 to facilitate using an LFOV associated with a virtual location marker to track a location of a mobile computing device in relation to the virtual location marker. At operation 502, system 100 may access information associated with a virtual location marker positioned in relation to a geographic area. This may be accomplished in any suitable manner. For example, system 100 may access a location database in which information specifying the coordinates of the virtual location marker is stored and that defines an LFOV that extends directionally from the virtual location marker. Such a location database may also store a 3D map of the geographic area.

At operation 504, system 100 may track a location of a mobile computing device at the geographic area. For example, system 100 may access GPS information, timing signal information, and/or beacon signal strength information from the mobile computing device to determine where the mobile computing device is currently located at the geographic area.

At operation 506, system 100 may determine whether the mobile computing device is at least partially within an LFOV at the geographic area. If the answer at operation 506 is "NO," the flow may return to before operation 506. If the answer at operation 506 is "YES," system 100 may perform a predefined operation at operation 508. System 100 may perform any suitable predefined operation as may serve a particular implementation.

In certain examples, a predefined operation may include adding an item that is purchasable by a user to a virtual shopping cart associated with the user. In such examples, a virtual location marker may be associated with the item that is purchasable by the user. For example, the virtual location marker may be mapped to a position within a store where the item is located. When the user carries the mobile computing device within an LFOV associated with the virtual location marker, system 100 may facilitate adding the item to the virtual shopping cart in any suitable manner.

In certain examples, a predefined operation may additionally or alternatively include providing one or more notifications by way of the mobile computing device. Such notifications may provide any suitable information associated with an LFOV. To illustrate an example, a mobile computing device may correspond to a robotic device operating in a warehouse or other facility where inventory items are stored. In such examples, the robotic device may provide a first notification to system 100 indicating that the robotic device has entered an LFOV associated with a pallet on which inventory items are stored. The robotic device may further provide a second notification that provides system 100 with any suitable information associated with the pallet and/or the inventory items. For example, the second notification may indicate and amount of inventory items on the pallet, an environmental condition (e.g., temperature, humidity, etc.) surrounding the pallet, information regarding adjacent pallets/inventory items, and/or any other suitable information. The first and second notifications in such an example may be provided by the robotic device to system 100 in any suitable manner to automatically update an inventory ledger of the warehouse or other facility.

In an alternative retail shopping implementation, a first notification may indicate that the mobile computing device has entered an LFOV. A second notification may inquire whether the user wants to add an item associated with the LFOV to a virtual shopping cart, and a third notification may inform the user of a mobile computing device that the item has been added to the virtual shopping cart.

Such notifications may be provided in any suitable manner. For example, a notification may include a text notification, an audio notification, a haptic feedback notification, and/or any other suitable type of notification. To continue with the example described above, a user may move within an LFOV associated with the item that is purchasable by the user. When the user enters the LFOV, a smartphone of the user may vibrate to inform the user that they have entered the LFOV. In addition, the smartphone may provide a text notification by way of graphical user interface that provides any suitable information associated with the item to the user. For example, such a graphical user interface may provide an image of the item, item attributes, item price, and an item quantity adjustment dial (e.g., in a large font with +/−) to edit the quantity of the item. In certain examples, system 100 may provide a time limit (e.g., 5-10 seconds) for the user to interact with the graphical user interface. If the time limit expires without a user interaction, system 100 may determine that the user is not interested in the item and may cause the mobile computing device to revert to a default graphical user interface that is not specific to the item.

In certain examples, a notification may further include an estimate of how many of a given item a particular user may want to purchase. System 100 may determine the number to propose to the user in any suitable manner. For example, system 100 may implement any suitable machine learning algorithm to approximate a quantity of a given item to propose to a user. To illustrate, a machine learning based predicted quantity of an item may equal a procured quantity of the item minus a seasonally adjusted item quantity. The seasonally adjusted item quantity may equal an average (e.g., monthly average) of the item multiplied by a seasonality factor. The seasonality factor may equal an average quantity of the item divided by the quantity of the item in a given month.

In certain examples, the predefined operation may include automatically initiating an exchange of information between a mobile computing device and an entity associated with a geographic area. For example, system 100 may automatically retrieve information from a mobile computing device upon entry of the mobile computing device within an LFOV without requiring further input from the user of the mobile computing device. To illustrate an example, a geographic area may correspond to a border crossing from Canada into the United States. In such an example, an LFOV may be positioned in relation to a border control and customs checkpoint at an entry point into the United States. When a user enters the LFOV at the border control and customs checkpoint, system 100 may automatically initiate an exchange of documents (e.g., visa documents, citizenship documents, vaccination status documents, etc.) with border control and customs agents to streamline the border crossing process.

In another example, a geographic area may correspond to a sports venue that requires tickets, proof of vaccination, and/or any other information from a spectator prior to the spectator gaining entry into the sports venue. In such examples, an LFOV may be located at each entry gate into the venue. When a user enters one of the LFOVs at an entry gate, system 100 may automatically receive access authorization information (e.g., ticket information, vaccine status information, etc.) from a mobile computing device of the spectator to determine whether the spectator is authorized to enter the sports venue.

Returning to FIG. 5, after system 100 performs the predefined operation, the flow may return to before operation 506. System 100 may then repeat operations 506 and 508 any suitable number of times as the mobile computing device moves within the geographic area.

Figure 6:
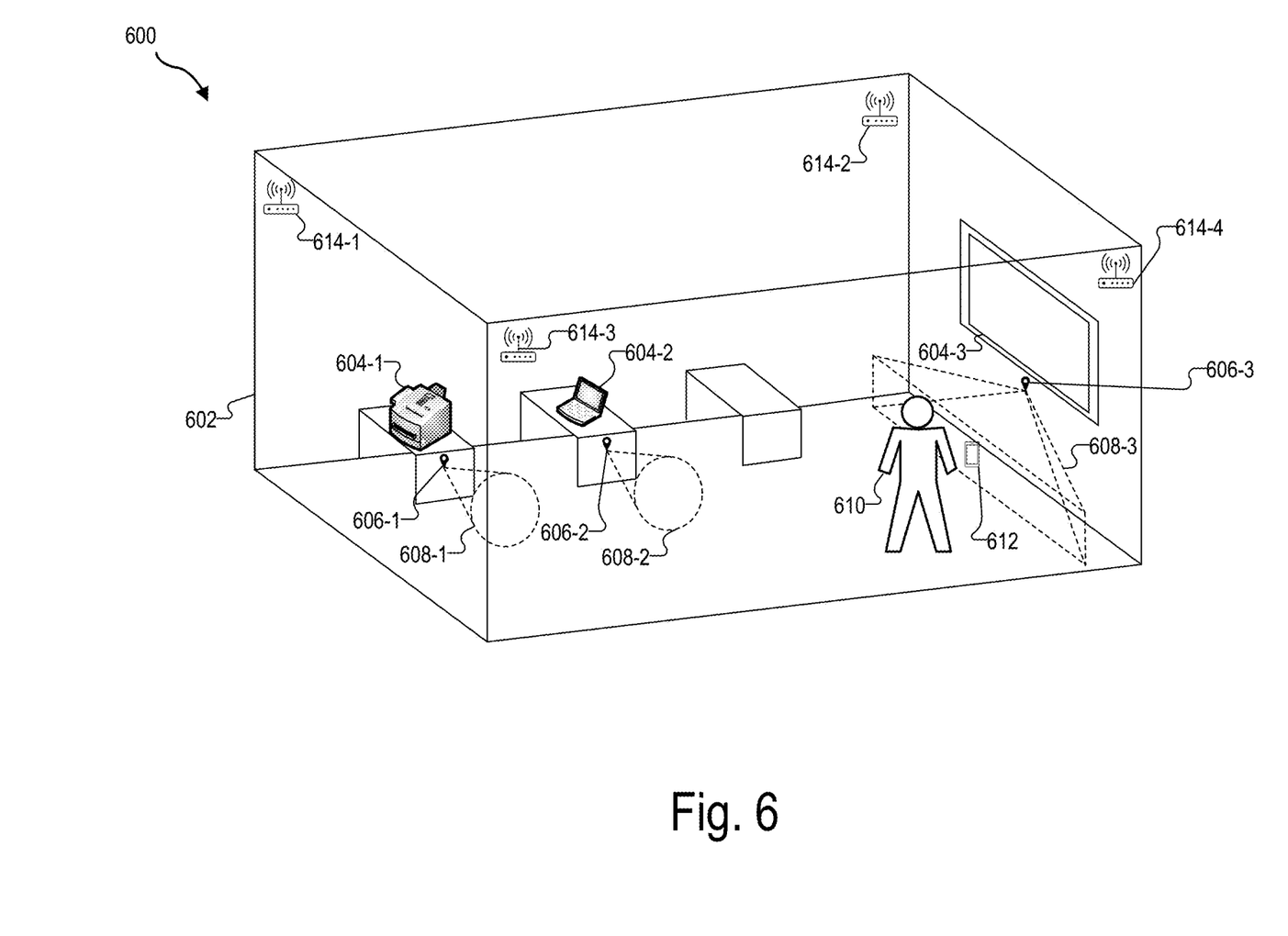
FIGS. 6-7 illustrate additional exemplary implementations in which the proximity detection system of FIG. 1 may be provided according to principles described herein.

FIG. 6 illustrates an exemplary implementation 600 that shows an example of system 100 being used in a retail space. As shown in FIG. 6, a geographic area 602 may correspond to a store that sells electronic devices 604 (e.g., electronic devices 604-1 through 604-3). A virtual location marker 606 (e.g., virtual location markers 606-1 through 606-3) is defined so as to be virtually positioned adjacent to a respective electronic device 604. Further, an LFOV 608 (e.g., LFOV 608-1 through 608-3) extends directionally from each of virtual location markers 606.

In the example shown in FIG. 6, LFOVs 608-1 and 608-2 are each provided in the shape of a 3D cone and LFOV 608-3 is provided in the shape of a 3D pyramid. Each of LFOVs 608-1, 608-2, and 608-3 extend from a respective virtual location marker 606 into an area of geographic area 602 where a shopper may walk when browsing electronic devices 604.

LFOVs 608 are shown in dashed lines in FIG. 6 for illustrative purposes. It is understood that LFOVs may be transparent (e.g., not visible) to shoppers at geographic area 602. Similarly, virtual location markers 606 are shown as location icons in FIG. 6. However, it is understood that virtual location markers 606 may also be transparent (e.g., not visible) to shoppers at geographic area 602. Alternatively, virtual location markers 606 may mark the real-world position of a sticker, price tag, information placard, etc. at geographic area 602.

A user 610 of a mobile computing device 612 may enter geographic area 602 and launch a shopping application executed on mobile computing device 612 to facilitate the user shopping at a store represented by geographic area 602. In certain examples, user 610 may be required to provide proof of identity to use the shopping application. For example, user 610 may be required to enter a password, provide biometrics (e.g., a fingerprint scan), and/or any other suitable proof.

As user 610 and mobile computing device 612 move within geographic area 602, system 100 may track a location of mobile computing device 612 in any suitable manner, such as described herein. For example, system 100 may use beacons 614 (e.g., beacons 614-1 through 614-4) to track the location of mobile computing device 612 as user 610 moves within geographic area 602. As shown in FIG. 6, user 610 is currently in front of electronic device 604-3 such that mobile computing device 612 may be within LFOV 608-3. Based on the location of mobile computing device 612, system 100 may access a location database that includes information defining LFOVs 608 and determine based on the information in the location database that mobile computing device 612 is within LFOV 608-3. The location of mobile computing device 612 within LFOV 608-3 may indicate that user 610 is interested in purchasing electronic device 604-3. Accordingly, system 100 may provide a notification (e.g., a text notification) by way of mobile computing device 612 asking whether user 610 would like to purchase electronic device 604-3. User 610 may then interact with a graphical user interface displayed by way of mobile computing device 612 to either add electronic device 604-3 to a virtual shopping cart or decline to purchase electronic device 604-3. If user 610 decides to purchase electronic device 604-3, user 610 may virtually add electronic device 604-3 to a virtual shopping cart and may physically add electronic device 604-3 to a real shopping cart (not shown) of user 610. Alternatively, user 610 may virtually add electronic device 604-3 to a virtual shopping cart and may pick up electronic device 604-3 at a different location (e.g., at a will call counter) after checking out.

In certain examples, user 610 may be prompted to enter an identifier of the LFOV associated with the item added to the virtual shopping cart. Such an identifier may be provided by way of a sticker or signage located at the real-world position in geographic area 602 that is associated with virtual location marker 606-3.

User 610 may then continue shopping and may add one or more other of electronic devices 604 to the virtual shopping cart. Upon completion of shopping, user 610 may enter a checkout section where a checkout LFOV (not shown) may be virtually positioned to facilitate a touchless checkout and payment for the items in the virtual shopping cart.

In certain examples, system 100 may automatically checkout user 610 and process payment for the items in the virtual shopping cart as user 610 passes through the checkout LFOV. In such examples, user 610 may simply walk out of the store at geographic area 602 and know that payment has been made by way of, for example, a previously authorized electronic funds transfer mechanism operating through the application executed by mobile computing device 612.

In certain alternative examples, system 100 may perform an audit check when user 610 enters the checkout LFOV to prevent fraud and ensure that user 610 pays for each of the items in the virtual shopping cart. In such examples, an employee of the store may either randomly scan a few items in a real shopping cart of user 610 or may manually check each item in the real shopping cart against the virtual shopping cart to verify that the correct items are being paid for. In certain examples, the checkout and payment may be performed in response to a one click approval by the employee of the store at geographic location 602.

Figure 7:
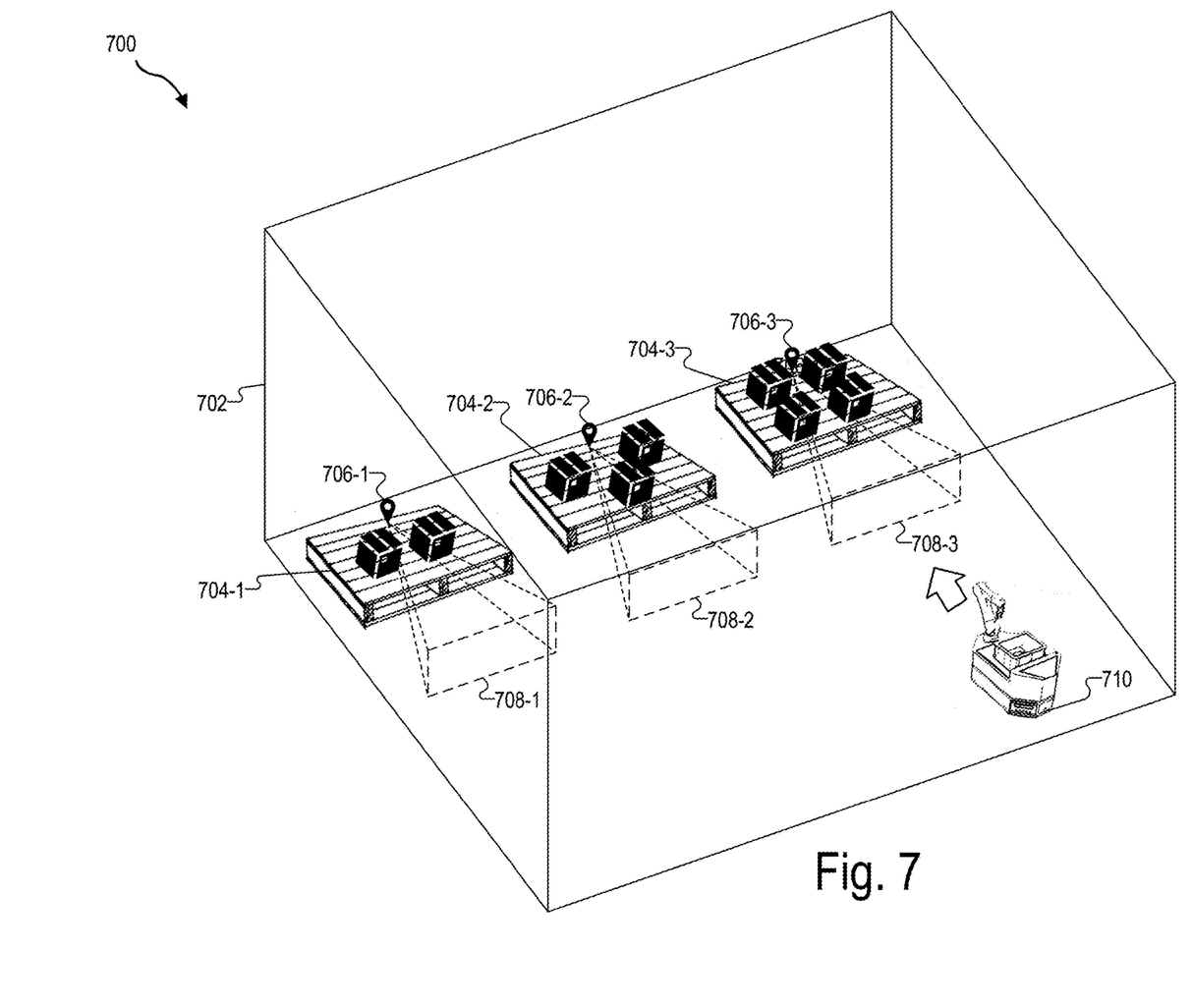

FIG. 7 illustrates an exemplary implementation 700 that shows an example of system 100 being used in a warehouse implementation. As shown in FIG. 7, a geographic area 702 may correspond to a warehouse in which pallets 704 (e.g., pallets 704-1 through 704-3) and inventory items are stored. A virtual location marker 706 (e.g., virtual location markers 706-1 through 706-3) is defined so as to be virtually positioned with respect to a respective pallet 704. Further, an LFOV 708 (e.g., LFOV 708-1 through 708-3) extends directionally from each of virtual location markers 706.

In the example shown in FIG. 7, LFOVs 708-1 through 708-3 are each provided in the shape of a 3D pyramid. However, any other suitable 3D shape may be used in other implementations. Each of LFOVs 708-1 through 708-3 extend from a respective virtual location marker 706 into an aisle region of geographic area 702 where a mobile robotic device 710 may travel.

Similar to FIG. 6, LFOVs 708 are shown in dashed lines in FIG. 7 for illustrative purposes. It is understood that LFOVs may be transparent (e.g., not visible) at geographic area 702. Similarly, virtual location markers 706 are shown as location icons in FIG. 7. However, it is understood that virtual location markers 706 may also be transparent (e.g., not visible) at geographic area 702. Alternatively, virtual location markers 706 may mark the real-world position of a sticker, price tag, information placard, etc. at geographic area 702.

As mobile robotic device 710 moves within geographic area 702, system 100 may track a location of mobile robotic device 710 in any suitable manner, such as described herein. As shown in FIG. 7, mobile robotic device 710 is currently moving in the direction of pallet 704-3 such that mobile robotic device 710 may enter within LFOV 708-3. Based on the location of mobile robotic device 710, system 100 may access a location database that includes information defining LFOVs 708 and determine based on the information in the location database that mobile robotic device 710 is at least partially within LFOV 708-3. The location of mobile robotic device 710 at least partially within LFOV 708-3 may trigger one or more operations with respect to pallet 706-3. For example, mobile robotic device 710 may take inventory of pallet 704-3 and determine that four items of inventory are currently on pallet 704-3, mobile robotic device 710 may detect environmental conditions (e.g., temperature, humidity, etc.) associated with the area around pallet 704-3, mobile robotic device 710 may retrieve or return an inventory item to pallet 704-3, mobile robotic device 710 may provide any suitable information to system 100 to update an inventory ledger, and/or may perform any other suitable operation.

Figure 8:
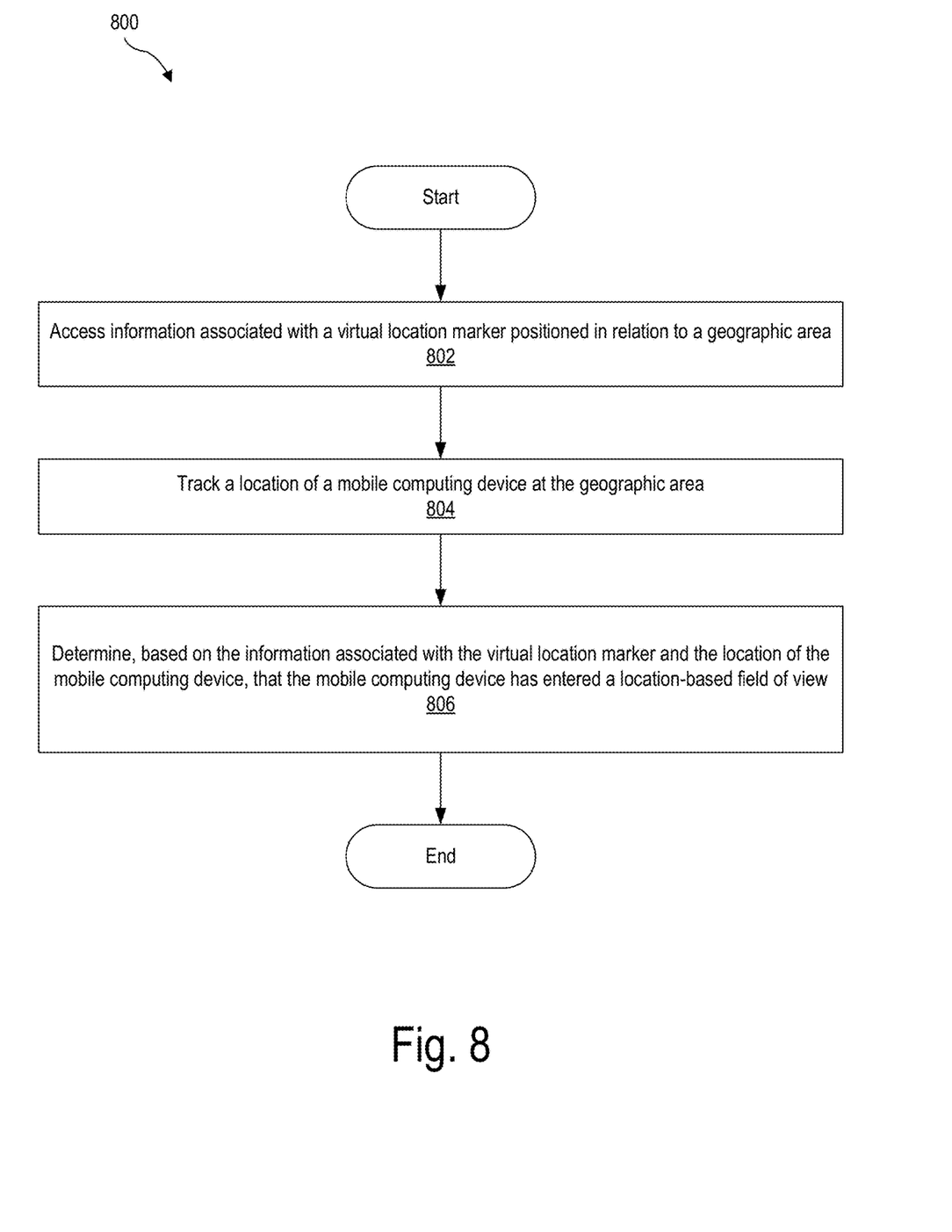
FIGS. 8-9 illustrate exemplary methods for using a location-based field of view associated with a virtual location marker according to principles described herein.

FIG. 8 illustrates an exemplary method 800 for using a location-based field of view associated with a virtual location marker. While FIG. 8 illustrates exemplary operations according to one embodiment, other embodiments may add to and/or modify the operations shown in FIG. 8. The operations shown in FIG. 8 may be performed by system 100, any components included therein, and/or any implementation thereof.

At operation 802, a proximity detection system (e.g., proximity detection system 100) may access information associated with a virtual location marker positioned in relation to a geographic area. Operation 802 may be performed in any of the ways described herein.

At operation 804, the proximity detection system may track a location of a mobile computing device at the geographic area. Operation 804 may be performed in any of the ways described herein.

At operation 806, the proximity detection system may determine, based on the information associated with the virtual location marker and the location of the mobile computing device, that the mobile computing device has entered a LFOV. Operation 806 may be performed in any of the ways described herein.

Figure 9:
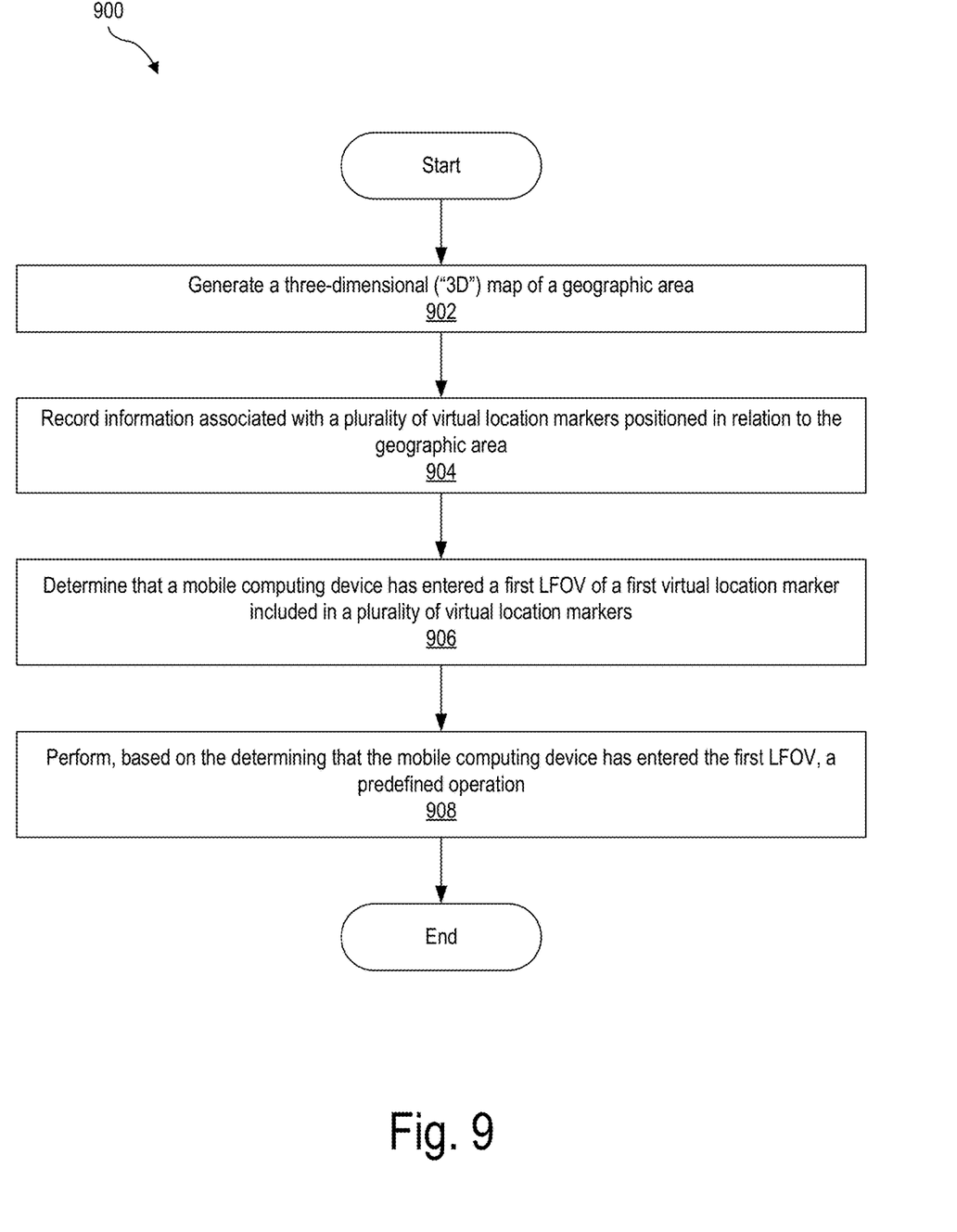

FIG. 9 illustrates an additional exemplary method 900 for using a location-based field of view associated with a virtual location marker. While FIG. 9 illustrates exemplary operations according to one embodiment, other embodiments may add to and/or modify the operations shown in FIG. 9. The operations shown in FIG. 9 may be performed by system 100, any components included therein, and/or any implementation thereof.

At operation 902, a proximity detection system (e.g., proximity detection system 100) may generate a 3D map of a geographic area. Operation 802 may be performed in any of the ways described herein.

At operation 904, the proximity detection system may record information associated with a plurality of virtual location markers positioned in relation to the geographic area. Operation 804 may be performed in any of the ways described herein.

At operation 906, the proximity detection system may determine that a mobile computing device has entered a first LFOV of a first virtual location marker included in a plurality of virtual location markers. Operation 906 may be performed in any of the ways described herein.

At operation 908, the proximity detection system may perform, based on the determining that the mobile computing device has entered the first LFOV, a predefined operation. Operation 908 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Exemplary volatile storage media include, but are not limited to, RAM (e.g., dynamic RAM).

Figure 10:
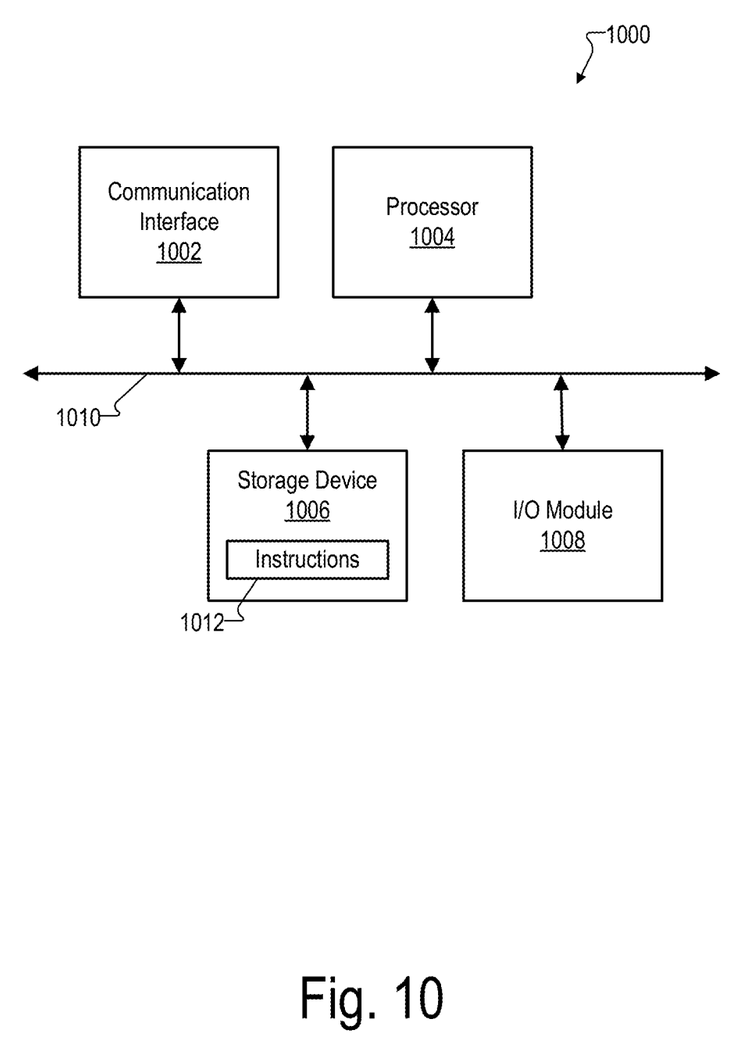
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output (I/O) module 1008 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more location databases residing within storage device 1006.

I/O module 1008 may include one or more I/O modules configured to receive user input and provide user output. One or more I/O modules may be used to receive input for a virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1000. For example, memory 102 may be implemented by storage device 1006, and processor 104 may be implemented by processor 1004.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a proximity detection system, information associated with a virtual location marker positioned in relation to a geographic area, the information defining a location-based field of view ("LFOV") that extends directionally from the virtual location marker;
   tracking, by the proximity detection system, a location of a mobile computing device at the geographic area;
   determining, by the proximity detection system and based on the information associated with the virtual location marker and the location of the mobile computing device, that the mobile computing device has entered the LFOV that extends directionally from the virtual location marker;

detecting, by the proximity detection system, movement patterns of other mobile computing devices in the geographic area with respect to the LFOV; and automatically adjusting, by the proximity detection system and based on the movement patterns, at least one of a size, shape, or configuration of the LFOV, wherein the LFOV is a virtual three-dimensional ("3D") shape that has a cross section that increases in size with distance from the virtual location marker.

2. The method of claim 1, wherein the LFOV extends in a predefined fixed direction from the virtual location marker.

3. The method of claim 1, wherein the tracking of the location of the mobile computing device includes tracking the location based on signals received by the mobile computing device from one or more of a plurality of beacon devices located at the geographic area.

4. The method of claim 1, wherein the information associated with the virtual location marker further specifies a fixed location of the virtual location marker in relation to the geographic area.

5. The method of claim 1, further comprising performing, by the proximity detection system and based on the determining that the mobile computing device has entered the LFOV, a predefined operation.

6. The method of claim 5, wherein the predefined operation includes providing a notification by way of the mobile computing device indicating that the mobile computing device has entered the LFOV.

7. The method of claim 5, wherein the predefined operation includes automatically initiating an exchange of information between the mobile computing device and an entity associated with the geographic area.

8. The method of claim 5, wherein:
the virtual location marker is associated with an item purchasable by a user of the mobile computing device; and
the predefined operation includes adding the item to a virtual shopping cart associated with the user based on the determining that the mobile computing device has entered the LFOV.

9. A method comprising:
generating, by a proximity detection system, a three-dimensional ("3D") map of a geographic area;
recording, by the proximity detection system, information associated with a plurality of virtual location markers positioned in relation to the geographic area, the information specifying coordinates of the plurality of virtual location markers within the 3D map and defining a location-based field of view ("LFOV") for each virtual location marker included in the plurality of virtual location markers, each LFOV extending directionally from a respective virtual location marker included in the plurality of virtual location markers;
determining, by the proximity detection system, that a mobile computing device has entered a first LFOV of a first virtual location marker included in the plurality of virtual location markers;
performing, by the proximity detection system and based on the determining that the mobile computing device has entered the first LFOV, a predefined operation;
detecting, by the proximity detection system, movement patterns of other mobile computing devices in the geographic area with respect to the first LFOV; and automatically adjusting, by the proximity detection system and based on the movement patterns, at least one of a size, shape, or configuration of the first LFOV, wherein the first LFOV is a virtual three-dimensional ("3D") shape that has a cross section that increases in size with distance from the virtual location marker.

10. The method of claim 9, wherein:
the plurality of virtual location markers includes the first virtual location marker and a second virtual location marker; and
the first LFOV of the first virtual location marker is different in at least one of size, shape, or orientation than a second LFOV of the second virtual location marker.

11. The method of claim 9, wherein the predefined operation includes providing a notification by way of the mobile computing device that the mobile computing device has entered the first LFOV.

12. The method of claim 9, wherein:
the first virtual location marker is associated with an item purchasable by a user of the mobile computing device; and
the predefined operation includes adding the item to a virtual shopping cart associated with the user based on the determining that the mobile computing device has entered the first LFOV.

13. The method of claim 12, further comprising:
determining, by the proximity detection system, that the mobile computing device has entered a second LFOV of a second virtual location marker included in the plurality of virtual location markers; and
performing, by the proximity detection system and based on the determining that the mobile computing device has entered the second LFOV, an additional predefined operation.

14. The method of claim 13, wherein:
the second virtual location is associated with a checkout section at the geographic area; and
the performing of the additional predefined operation includes facilitating the user purchasing the item in response to the determining that that the mobile computing device has entered the second LFOV.

15. A system comprising:
a processor configured to execute instructions to:
access information associated with a virtual location marker positioned in relation to a geographic area, the information defining a location-based field of view ("LFOV") that extends directionally from the virtual location marker;
track a location of a mobile computing device at the geographic area;
determine, based on the information associated with the virtual location marker and the location of the mobile computing device, that the mobile computing device has entered the LFOV that extends directionally from the virtual location marker;
detect movement patterns of other mobile computing devices in the geographic area with respect to the LFOV; and
automatically adjust, based on the movement patterns, at least one of a size, shape, or configuration of the LFOV,
wherein the LFOV is a virtual three-dimensional ("3D") shape that has a cross section that increases in size with distance from the virtual location marker.

16. The system of claim 15, wherein the LFOV extends in a predefined fixed direction from the virtual location marker.

17. The system of claim 15, wherein the information associated with the virtual location marker further specifies a fixed location of the virtual location marker at the geographic area.

\* \* \* \* \*